2,898,304
PREPARATION OF SPHERICAL CONTACT MASSES

Manly J. Powell, South Plainfield, and Tom A. Cecil, Highland Park, N.J., assignors to Minerals & Chemicals Corporation of America, Menlo Park, N.J., a corporation of Maryland No Drawing. Application February 21, 1956
Serial No. 566,768

5 Claims. (Cl. 252—450)

This invention relates to the preparation of adsorptive contact masses from naturally occurring clay. More particularly our invention relates to a process for producing from kaolinitic clay adsorptive contact masses in the form of hard spherical particles and to the contact masses produced by such process. The term spherical, as used herein, is intended to include within its meaning not only those shapes which are truly spherical but also shapes which approach the spherical, as for example, those which are sometimes referred to as spheroidal.

The adsorptive contact masses of our invention are especially useful as hydrocarbon conversion catalysts in the well known fluid catalytic cracking process. Our active contact masses, however, are also useful as adsorbents for decolorizing vegetable and mineral oils, and for various other purposes.

In a copending U.S. patent application Serial No. 490,128, filed February 23, 1955, by Alfred J. Robinson and James V. Weir, there is disclosed a novel process for the preparation of active contact masses from kaolinitic clay. Such process is referred to therein as a "dry process" to distinguish it from previously known methods of activating clay with acid which are therein called "wet processes" since the latter entail aqueous leaching of the clay-acid reaction product to remove soluble salts. Briefly the "dry process" involves mixing sulfuric acid and clay until the mixture appears to be uniform. The mixture then is aged under conditions of time and temperature such as to permit substantial reaction between the clay, specifically the alumina of the clay, and the acid. The reacted mixture is then calcined at a temperature sufficiently high to decompose aluminum sulfate formed as a result of the reaction, thereby to produce high quality adsorptive contact masses, especially suitable as hydrocarbon conversion catalysts.

As disclosed in the above-mentioned U.S. patent application Serial No. 490,128, it is usually desirable at some stage in the "dry process" to form the clay into particles of suitable or necessary size for the hydrocarbon conversion process or other process in which the resulting contact masses ultimately are to be employed. Thus, the contact masses may be in the form of granules particularly suitable for use in fixed bed cracking processes and TCC processes, or small spherical particles (conventionally referred to as microspheres) especially suited for fluid catalytic cracking processes. Formation of the shaped particles can be accomplished at various stages of the process prior to the calcination step by methods which are apparent to those skilled in the art. For example, the clay-acid mixture can be extruded, just after the mixing step and prior to aging or after aging and before calcination, to form pellets ranging in size from about 10 mesh to about 4 mesh which are suitable for conventional fixed bed cracking processes and TCC processes. In the case of a fluid catalyst, the clay can be reacted with acid and the product formed into a suitable slurry or slip for conventional spray drying to form microspheres prior to calcination. Experience has shown that a fluid catalyst should consist of microspheres preferably within the size range of about 20 to about 150 microns in equivalent spherical diameter, but in any case with not more than about 20 percent of its weight made up of particles finer than about 40 microns.

The novel process of the above-mentioned U.S. patent application Serial No. 490,128 yields superior contact masses of high surface area and activity. We have found that microspheres produced by spray drying the reacted clay-acid mixture in accordance with conventional spray drying methods, while well formed and suitable for some purposes, are not of sufficient hardness for commercial fluid catalytic cracking processes. Thus, prior to our invention, our efforts to produce hard microspheres of the adsorptive contact material covered by the aforesaid U.S. patent application by spray drying or other methods shown in the art for forming microspherical particles from clay and the like have been unsuccessful.

Accordingly, one object of our invention is to provide novel adsorptive contact masses in the form of hard spherical particles, especially suitable as a catalyst in conventional fluid hydrocarbon conversion processes.

Another object of our invention is to provide a novel process for preparing from kaolinitic clay hydrocarbon conversion catalysts in the form of small spherical particles or microspheres.

It is a further object of this invention to provide a process for converting kaolinitic clays to fluid cracking catalysts which avoids a troublesome water leaching step.

Other objects and features of our invention will be apparent from the description and examples thereof which follow.

We have found that adsorptive contact masses of the copending U.S. patent application Serial No. 490,128 can be produced in the form of hard microspheres, especially suitable for conventional fluid hydrocarbon conversion processes, by a simple and economical treatment of the reacted clay-acid mixture prior to the calcination step which treatment apparently establishes a critical drying condition as the microspheres take shape. Such treatment broadly comprises dispensing the reacted clay-acid mixture in the form of an aqueous slurry or slip into a hot organic liquid of a type hereinafter specified. The mixture is thus formed into discrete spherical particles as water is rapidly vaporized therefrom.

An advantage of our process resides in the marked improvement in hardness of the microspheres, after calcination, as compared with that of similar microspheres formed by conventional spray drying procedures. We are aware of the teachings of prior patents that spherical contact masses can be formed from slurries of activated clay and certain hydrosols by conventional spray drying and by dispersion in immiscible solvents at room temperature or temperatures about the boiling point of water. However, our efforts to produce the hard microspheric contact masses of our invention by such prior art processes have been unsuccessful.

The process of the present invention is especially suitable for the treatment of kaolin clays, by which is meant those naturally occurring clays containing kaolinite as the chief mineral constituent. The chemical composition of kaolinite is represented by the following formula, $Al_2O_3 \cdot 2SiO_2 \cdot XH_2O$ where X is usually 2. The weight ratio of $SiO_2$ to $Al_2O_3$ indicated by this formula is 1.18 and kaolin clays normally possess $SiO_2/Al_2O_3$ ratios of from 1.0 to 1.5.

In accordance with our invention an acid activatable clay, preferably kaolin, is mixed with sulfuric acid to an appearance of homogeneity in any conventional mixer suitable for this purpose such, for example, as a pug mill. While we prefer to use degritted raw clay (that which has been refined only to the extent that grit, foreign bodies and clots of undispersed clay have been eliminated) as a starting material to our process, we wish to have it understood that the invention is not limited to the treatment of degritted raw clay. Raw kaolin as mined or that which has received other preliminary treatment may be amenable to processing in accordance with our inventoin. By way of example preliminary treatments falling within this category include deironing by physical or chemical methods, conventional classifying operations, and even partial activation by methods known to those skilled in the art.

For our process we prefer to use concentrated sulfuric acid such, for example, as the commercially available 66° Bé. grade (about 93 percent $H_2SO_4$) gradually adding water to the clay-acid mixture if necessary to obtain good contact between the clay particles and the acid. Excellent results have been obained, however, with concentrations as low as 60 percent. While it is within the scope of our inventoin to utilize more dilute sulfuric acid solutions we prefer, for convenience, to employ stronger sulfuric acid.

We prefer to use acid dosages from about 60 percent to about 150 percent in our process, acid dosage being defined as the weight of 100 percent acid per weight of volatile free clay expressed on a percentage basis. The volatile-free weight of the clay is determined by heating a sample to essentially constant weight at about 1700° F. Although acid dosages much lower than 60 percent, down to as low as 20 percent, can be used in our process with some benefit, the clay conversion gradually falls off with decreasing dosage until ineffectual levels are reached. Although our preferred range of acid dosage is from about 60 percent to about 150 percent, dosages higher than 150 percent can be used within the scope of our invention. Approximately 130 percent dosage represents the theoretical amount of acid that would be required for substantially complete reaction with the alumina of an average kaolin clay.

The homogeneous clay-acid mixture is then reacted under such conditions of time and temperature as are necessary preferably to bring about substantial acid reaction between the acid and the alumina in the clay. We have experimentally discovered that optimum temperatures of aging the clay-acid mixtures of our invention fall within the limits of from about 250° to 500° F. and optimum times within the range from about 1 hour to 30 hours.

In accordance with our invention the reacted clay-acid mixture is dispersed in a hot organic liquid of a type hereinafter specified, thereby to form discrete spherical particles and simultaneously to rapidly vaporize water therefrom. Organic liquids suitable for use in our process are those which are substantially non-reactive with sulfuric acid and preferably have low vapor pressures at the elevated temperature at which the reacted clay-acid mixture is dispersed therein, but we do not wish to exclude the possibility of using lower boiling liquids in conjunction with a condenser system to prevent loss of vapors.

We have found to be especially suitable for our process hydrocarbon liquids, particularly saturated aliphatic higher molecular weight hydrocarbons which have been treated with sulfuric acid for removal of sulfonatable compounds such, for example, as white mineral oil. Kerosene can be employed in our process with a condenser system.

We do not wish to be bound by any theory as to why dispersing the aged clay-acid mixture in a hot hydrocarbon liquid results, after calcination of the shaped particles, in spherical contact masses of unexpected hardness by comparison with similarly shaped masses produced by conventional spray drying or by other processes heretofore known for producing spherical particles from clay and similar materials. However, it is postulated that the hot hydrocarbon liquid establishes a unique drying condition which results in the removal of water from the reacted clay-acid mixture while avoiding the formation of the higher hydrates of the aluminum sulfate produced during the action of the clay and acid. It is thought that if one or more of the higher hydrates of the aluminum sulfate were formed as the spherical particles were dried, subsequent decomposition thereof during the calcination step would weaken the spherical particles as the water of hydration was driven off. In any event we have found that by our novel process there can be produced spherical catalysts of marked superiority in hardness.

In the practice of our process the reacted clay-acid mixture is dispersed in liquid hydrocarbon heated to elevated temperature preferably within the range of 275° to 500° F. whereby discrete spherical particles of the mixture are formed with simultaneous vaporization of moisture. We have found that at lower temperatures, such as about 250° F. poor spheres are formed. While satisfactory spherical particles can be formed using hydrocarbon liquids maintained at temperatures in excess of 500° F. for economic reasons it is preferred to utilize temperatures within the range of 275° F. to 500° F.

In order to disperse the reacted clay-acid mixure, thereby forming the desired spherical particles or microspheres, the reacted material should be in the form of a slurry or slip, preferably aqueous. When large dosages of sulfuric acid in low concentration are employed the clay-acid mixture may be dispersed after aging without further treatment. However, when our preferred dosages and concentrations of sulfuric acid are used, the aged material is in the form of a hard mass. In order to disperse this material we usually grind it and then mix it with sufficient water to yield a slurry or slip which is capable of being dispersed. The optimum solids content of the slurry or slip for the dispersing operation depends, among other things, on the apparatus used, and can be readily determined by tests and observation, as will be recognized by those skilled in the art.

As hereinbefore mentioned, our invention is particularly suitable for producing a cracking catalyst of spherical shape and of the size desired for commercial fluid hydrocarbon cracking processes. A fluid catalyst should preferably consist of particles within the size range of from about 100 mesh to about 325 mesh, but in any case with not more than about 20 percent of its weight made up of particles of minus 325 mesh size. By proper control of conditions under which the reacted clay-acid material is dispersed, spherical catalysts of this or other size range may be obtained. Thus, where the dispersing step is carried out by spraying the slurry, the size of the spherical particles may be varied, as will be recognized by those skilled in the art, by control of the feed rate and solids content of the feed slurry. Also the temperature of the hot hydrocarbon liquid will influence the particle size of the microspheres, the higher the temperature the smaller the particles. It should be pointed out, however, that if the spherical particles are too large, the rapid vaporization of the water therefrom as they are dispersed in the hot oil will weaken them and in severe cases cause them to fracture.

It is necessary to maintain the spherical particles in the hot hydrocarbon liquid only for a time sufficient to vaporize most of the free moisture from the material. This is accomplished within a very short time such as within a few seconds after the reacted clay-acid material contacts the hot liquid; however, if desired the spherical particles may be permitted to remain in the hot liquid for a period of time thereafter without detrimental results.

The shaped contact masses of the desired particle size are then removed from the hot hydrocarbon liquid and subjected to calcination under time and temperature conditions such as to decompose the aluminum sulfate therein and render the product substantially sulfate free. In most cases a temperature of from about 900° F. to about 1600° F., depending on the calcination atmosphere, and a time of between 1 and 24 hours, is sufficient. While we do not wish to exclude all calcination temperatures outside of the range stated, we would like to make clear that at temperatures much below 900° F. the aluminum sulfate decomposition may be incomplete and that temperatures above 1600° F. may manifest themselves in lowered surface area of the final contact masses.

It is within the scope of our invention to incorporate not more than about 10 percent, on a total weight of mix basis, of a combustible filler into the clay-acid mixture of our process prior to dispersion of the mixture in the hot hydrocarbon liquid. This filler, among other things, serves to increase the porosity of the final catalyst since it is eliminated during the calcination step, leaving voids. Examples of fillers suitable for our process are wood flour, corn meal, sawdust, carbon and the like.

Following are examples included for purposes of illustrating our invention which are not to be construed as limiting the invention to any particular embodiment disclosed therein.

In the following examples surface area was determined by the method described in the article by Brunauer, Emmett and Teller appearing in J. Am. Chem. Soc. 60, 309 to 319 (1938), using a cross-sectional area of 15.4 Å2 for the nitrogen molecule as suggested by H. K. Livingston in J. Colloid Sci., 4, 447/458 (1949).

Hardness of the spherical contact masses was determined by two methods, namely, by a "slate" test and with a roller particle size analyzer which conventionally is used for determination of attrition losses as an indication of hardness. The slate test is a qualitative one which gives an indication of the hardness of particles and is made simply by rubbing the particles on slate. By this test a material is determined to be "soft" if it has a tendency to powder when rubbed on slate and "hard" if it does not tend to break up. Spherical contact masses which are determined to be hard by this slate test possess suitable hardness for most commercial uses.

In determining hardness by means of a roller particle size analyzer (standard equipment manufactured by American Instrument Company) the sample to be tested is first screened to obtain a minus 200 plus 325 fraction, which is calcined for 16 hours at about 1000° F. Approximately 13 grams of this calcined fraction is placed in the roller apparatus wherein an air jet impinges upon it, causing attrition as a result of contact of one particle by another, the extent of the attrition depending, of course, on the hardness of the material. Very fine particles resulting from attrition are blown from the main body of the sample and collected and weighed. The amount of this very fine material is calculated and expressed as percent of the original sample weight for various periods of time of operation of the analyzer, frequently up to 60 hours. This is reported as percent weight loss for a given time of operation of the equipment. For purposes of comparison a commercial synthetic catalyst by roller analysis will have a weight loss of about 7 to 9 percent for 20 hours and about 11 to 15 percent for 60 hours. Obviously the smaller the weight loss the harder the material.

Example I

This example is to show that we have been unable to produce from kaolin clay, which has been reacted with sulfuric acid, hard particles by conventional spray-drying procedure used frequently for forming spherical particles from other materials including raw clay. Raw kaolin from Washington County, Georgia, having a VM of 30 percent, was crushed to minus 8 mesh and pugged to an appearance of homogeneity with 95 percent concentration sulfuric acid in an amount equal to 95 percent dosage.

The mixture was aged within a temperature range of from 220° to 250° F. for about 24 hours. The aged material was then crushed to minus 4 mesh and dispersed in water to form a slurry containing 20 percent solids. The slurry was then fed to a commercial 7-foot spray dryer operated under conditions to produce spherical particles having the following screen analysis:

| Fraction: | Percent |
|---|---|
| 0 to 100 | 16.2 |
| 100 to 170 | 15.6 |
| 170 to 200 | 5.3 |
| 200 to 325 | 20.9 |
| T-325 | 6.0 |

The air inlet temperature to the spray dryer was maintained at 1000° F. while the outlet temperature was about 400° F. The resulting spherical particles after calcination at 1500° F. for six hours were found to be extremely soft by the slate test and too soft to test by the roller analyzer, indicating their unsuitability as a commercial catalyst.

Example II

This example demonstrates the effectiveness of our novel process in producing active contact masses of spherical form which are especially suitable for use in fluid hydrocarbon conversion processes.

A 6,000 gram sample of kaolin clay from Washington County, Georgia, was pulverized and mixed to an appearance of homogeneity with sulfuric acid of 96 percent concentration in an amount equal to a dosage of 105 percent. The clay-acid mixture was aged at 300° F. for 24½ hours. The aged material was then crushed to about minus 3 mesh and dispersed in water to form a slip of about 16 percent solids content. The slip was "sprayed" into a mineral oil bath maintained at a temperature of 350° F. by dropping it slowly onto a stainless steel disc of two-inch diameter, situated approximately ¼ inch above the oil, revolving at 10,000 r.p.m. The resulting microspheres were removed from the hot oil bath and the oil removed therefrom (from the microspheres) by burning. The oil-free microspheres were handscreened through 100-mesh and 325-mesh sieves to obtain a minus 100 plus 325 fraction. A sample of the minus 100 plus 325 microspheres was calcined in a CO atmosphere at 1400° F. for three hours. The calcined microspheres were found to be hard by the slate test. In addition, the minus 200 plus 325 fraction was tested for hardness in a roller particle size analyzer and the microspheres exhibited a weight loss of only slightly more than 6 percent after 20 hours of running time and only about 8.3 percent after 60 hours.

The surface area of the calcined microspheres was measured and found to be 155 m.²/g., which value is indicative of commercial suitability of the material as a catalyst for hydrocarbon conversion purposes. The calcined microspheres were also tested for catalytic activity with results which corroborated the commercial suitability of the product indicated by its surface area. The catalytic activity was evaluated by means of a so-called CAT-A test using a method described by J. Alexander and H. G. Shimp in an article on page R537 of National Petroleum News, Technical Section, August 2, 1944. In this method, a standard light East Texas gas oil is contacted at a rate of 5 cc. per minute for 10 minutes with 200 cc. of catalyst pellets at 800° F. The liquid product from the cracking test is collected at a temperature of 60° F. Catalytic activity is measured as the volume percent yield of gasoline on a no-loss basis (N.L.B. gasoline yield) and given as the volume of 410° F. endpoint gasoline distilled from the aforesaid cracked product, corrected for 100 percent recovery, expressed as a percentage of the volume of gas oil charged. As part of the CAT-A test, the weight of coke deposited on the catalyst, weight of gas produced and gas specific gravity are determined. The coke and gas weights are expressed as percentages of gas oil charged. Two CAT-A cycles are run with only the data from the second cycle being used since experience has shown these data to be sound. The CAT-A results are given below.

N.L.B. gasoline yield _____ percent__ 33.9
Coke _____ do____ 4.3
Gas _____ do____ 9.0
Gas gravity _____ 1.18

Pellets were made from the microspheres for the CAT-A test with a tabletting machine.

One skilled in the art will recognize from the surface area and CAT-A data above that the microspheres produced in this example were possessed of sufficiently good catalytic activity, as well as selectivity, to render them commercially acceptable as a hydrocarbon conversion catalyst. By way of comparison, to show the substantial improvement in surface area and catalytic activity wrought in raw kaolin clay by our process, a sample of the raw clay was found to possess a surface area of only 20 m.$^2$/g. and to produce an N.L.B. gasoline yield of only 10.9 percent.

In addition to having good catalytic activity, the microspheres of this example were exceptionally hard, as proven by the slate test and shown by the results obtained with the roller analyzer. The roller results indicate, incidentally, that our microspheres were superior to commercial synthetic hydrocarbon conversion catalysts since the former exhibited weight losses of only 6 percent and 8.3 percent after 20 hours and 60 hours, respectively, whereas the commercial synthetic catalyst losses run from 7 to 9 percent and 11 to 15 percent after 20 hours and 60 hours, respectively.

Thus, the present example illustrates that our process produces microspheres of excellent hardness and good catalytic properties for the cracking of petroleum hydrocarbon to make gasoline.

*Example III*

This example illustrates the use of our process in the conversion of a kaolin clay from Tennessee into microspheres particularly suitable as a catalyst in the fluid catalytic cracking process of hydrocarbon conversion.

A sample of Tennessee kaolin, after having been dried at 250° F. and pulverized, was mixed to an appearance of homogeneity with sulfuric acid of 96 percent concentration in an amount equal to a dosage of 105 percent. The clay-acid mixture was aged at 300° F. for 24 hours. The aged material was then crushed to about minus 3 mesh and dispersed in water to form a slip of about 16 percent solids content. The slip was sprayed into a mineral oil bath, maintained at a temperature of 350° F. using the apparatus and method of Example 2. The resulting microspheres were removed from the hot oil bath and the oil then removed from them by burning. The oilfree microspheres were screened as described in Example 2 and the minus 100 plus 325 fraction calcined in CO for 3 hours at 1400° F. The calcined microspheres were found to be hard by the slate test.

The calcined microspheres were tested for catalytic activity by the CAT-A procedure with the following results:

N.L.B. gasoline yield _____ 27.7
Coke _____ 3.4
Gas _____ 5.8
Gas gravity _____ 1.07

The hardness and CAT-A data of the microspheres of this example show that a fluid catalyst suitable for use in the cracking of petroleum hydrocarbons to make gasoline was produced from Tennessee kaolin by our new process.

*Example IV*

This example shows that a catalyst prepared by our new process is very resistant to a steam treatment comprising the subjection of the catalyst to the action of 100 percent steam at a pressure of 50–60 p.s.i. and a temperature of 1050° F. for a period of 24 hours. This steam treatment is commonly used to determine the ability of a catalyst to withstand repeated regeneration without loss of activity.

A sample of the same kaolin clay as that used in Example II was subjected to substantially the same treatment as that of Example II through the step of obtaining the minus 100 plus 325 fraction of the microspheres, except that some of the oil was carbonized in situ on the microspheres, instead of all of it being burned completely off, after removal of the said microspheres from the oil bath. The minus 100 plus 325 microspheres were calcined in a fluid calciner in which the material was kept in a "fluid" state by the passage of steam therethrough. The microspheres were preheated to 500° F. in the calciner and then the temperature therein was slowly raised to 1100° F., and held there for 3 hours while steam was slowly passed through the bed of catalyst material. After this calcination in steam the microspheres were found to be free of sulfate and they were tested by the slate test and found to be hard. In addition, the minus 200 plus 325 fraction of the microspheres was tested for hardness in the afore-mentioned roller particle size analyzer and the weight losses were found to be about 6.3 percent and about 11.3 percent after 20 and 60 hours of running time respectively. Thus the hardness of the catalyst of this example was slightly superior to that of a commercial synthetic hydrocarbon conversion catalyst.

The surface area of the calcined microspheres was measured and found to be 151 m.$^2$/g., a value indicative of commercial suitability of the material as a catalyst for hydrocarbon conversion processes. The calcined microspheres were next subjected to the steam treatment described at the beginning of this example after which their surface area was determined again and found to be about 145 m.$^2$/g. Comparison of this surface area with that before the steam treatment shows substantially negligible loss of surface area as a result of the said steam treatment or, in other words, the comparison shows the microspheres to have possessed excellent steam stability. This property is obviously of great benefit in a commercial catalyst.

*Example V*

This example will illustrate several embodiments of our process using acid dosages of 80 percent and 150 percent, respectively.

Four samples of a water-washed, pulverized Georgia kaolin clay were each mixed with sulfuric acid of 96 percent concentration to an appearance of homogeneity; the acid dosages used were 80 percent each for two of the samples and 150 percent each for the other two samples. One of the 80-dosage clay-acid mixtures and one of the 150-dosage mixtures were aged at 250° F. for 4 hours and the remaining two mixtures were aged at 500° F. for 4 hours. Aqueous slurries were made from each of the 4 aged mixtures and each slurry was dispersed in a mineral oil bath maintained at about 350° F. to form microspheres therein. The method of dispersing was by spraying fine droplets of the slurries into the oil from a rapidly rotating disc or wheel. The microspheres were removed from the hot oil and ignited to burn off oil picked up from the oil bath. The ignited microspheres were calcined in a CO atmosphere for various lengths of time as indicated below:

| Dosage | Aging Temperature, °F. | Calcination Time, hr. |
|---|---|---|
| 80% | 250 | 3½ |
| 80% | 500 | 3 |
| 150% | 250 | 6 |
| 150% | 500 | 5 |

The microspheres were comprised substantially of particles of the desired size range for fluid catalyst purposes;

for example in the case of the 150-dosage, 250/4 (aged 4 hours at 250° F.) microspheres, 88 percent of the total weight was made up of minus 100 mesh particles and only 14.0 percent of the total weight comprised particles of minus 325 mesh size, this size distribution being very close to that indicated previously herein as the preferred one for fluid catalyst purposes.

The two 80-dosage batches of microspheres were each found to be hard by the slate test and their surface areas were measured and found to be 165 m.²/g. and 206 m.²/g. for those aged at 250° F. and at 500° F. respectively.

The two 150-dosage batches of microspheres were tested for hardness in the roller analyzer and their surface areas were measured. The hardness and surface area data for these two catalysts are tabulated below.

| Aging Temperature | Wt. Loss at 20 Hr., percent | Wt. Loss at 60 Hr., percent | Surface Area (m.²/g.) |
| --- | --- | --- | --- |
| 250° F | 9.7 | About 12.3 | 298 |
| 500° F | 7.2 | About 10 | 284 |

Thus, it has been demonstrated that fluid catalysts of good quality can be prepared from kaolin by our new process using acid dosages varying from 80 percent to 150 percent and aging temperatures varying from 250° to 500° F.

*Example VI*

This example again demonstrates the effectiveness of our novel process in producing active contact masses of spherical form which are especially suitable for use in fluid hydrocarbon conversion processes. A quantity of kaolin clay of the type used in Example I was mixed with 84 percent concentration sulfuric acid at 105 percent dosage and the mixture aged for 24 hours at 230° F. The aged material was made into a 25 percent solids slip with water. The slip was then atomized by dropping it slowly onto a stainless steel disk (2" in diameter) revolving at 5000 r.p.m., approximately ¼" above a mineral oil bath maintained at a temperature of 350° F. thereby dispersing aged material into the oil. The resulting spheres were removed from the hot oil bath and washed with mineral spirits to eliminate occluded oil. The spheres were then dried at 200° F. to evaporate the mineral spirits and then calcined at 1500° F. for six hours. The size distribution of the calcined spheres was determined by screening on a RO-TAP for 15 minutes with the following results:

| Fraction: | Percent |
| --- | --- |
| Plus 200 | 61.5 |
| Minus 200/plus 325 | 20.8 |
| Minus 325 | 17.7 |

The surface area of the spheres was measured and found to be 114 m.²/g. which is indicative of a commercially suitable catalyst for hydrocarbon conversion. In addition the minus 200 plus 325 fraction was tested for hardness in a roller particle size anlyzer and the spheres exhibited a weight loss of only 5.2 percent after 20 hours of running time, which compares favorably with commercial synthetic hydrocarbon conversion catalyst and which is an indication of excellent hardness.

*Example VII*

This example is similar to that of Example VI except that a Tennessee kaolin was treated in accordance with our invention. A sample of Tennessee kaolin dried at 225° F. and ground, was treated with 96 percent concentration sulfuric acid in a dosage of 105 percent, and aged for 24 hours at a temperature of 300° F. The aged material was ground and mixed with water to form a slurry of 25 percent solids. The resulting slurry was sprayed into a mineral oil bath maintained at a temperature of 350° F. thereby to form spherical particles with simultaneous vaporization of water therefrom. After removing the spheres from the hot oil bath they were calcined at 1500° F. for 6 hours. A size distribution analysis was made with the following results:

| Fraction: | Percent |
| --- | --- |
| Plus 200 | 69.9 |
| Minus 200 plus 325 | 23.2 |
| Minus 325 | 6.9 |

The spheres were well formed and were hard by the slate test.

We claim:

1. A process for the preparation of adsorptive contact masses in the form of hard spherical particles from kaolin clay comprising mixing kaolin clay with an aqueous solution of sulfuric acid having a concentration of at least 60% in an amount to provide from 60% to 150% by weight of $H_2SO_4$ based on the volatile free weight of said kaolin clay, reacting the kaolin clay with the sulfuric acid, dispersing the resulting reacted mixture in a hot white mineral oil to form discrete spherical particles thereof and to vaporize water therefrom, separating said spherical particles from said white mineral oil, and finally substantially eliminating sulfate from said spherical particles by calcining said spherical particles at a temperature of from 900° F. to 1600° F.

2. A process for the preparation of adsorptive contact masses in the form of hard spherical particles from kaolin clay comprising mixing kaolin clay with an aqueous solution of sulfuric acid having a concentration of at least 60% in an amount to provide from 60% to 150% by weight of $H_2SO_4$ based on the volatile free weight of said kaolin clay, reacting the kaolin clay with the sulfuric acid, forming an aqueous slip of the reacted mixture, dispersing the slip in a hot white mineral oil to form discrete microspheres of the reacted mixture and to vaporize water therefrom, separating said microspheres from the white mineral oil, and finally substantially eliminating sulfate from said microspheres by calcining said microspheres at a temperature of from 900° F. to 1600° F.

3. The process of claim 2 in which the white mineral oil is maintained at a temperature within the range of from about 275° F. to about 500° F.

4. A process for the preparation of adsorptive contact masses in the form of hard spherical particles from kaolin clay comprising mixing kaolin clay with an aqueous solution of sulfuric acid having a concentration of at least 60% in an amount to provide from 60% to 150% by weight of $H_2SO_4$ based on the volatile free weight of said kaolin clay, aging the mixture at a temperature of from about 250° F. to about 500° F. for a period of from about 1 to about 30 hours, forming an aqueous slip of the aged mixture, dispersing the aqueous slip into white mineral oil maintained at a temperature of from about 275° F. to about 500° F. to form discrete microspheres of the aged material and to vaporize water therefrom, separating the microspheres from the white mineral oil, and finally substantially eliminating sulfate from said microspheres by calcining said microspheres at a temperature of from 900° F. to 1600° F.

5. The process of claim 4 in which the aqueous slip is dispersed into the white mineral oil by spraying.

References Cited in the file of this patent

UNITED STATES PATENTS

| 1,739,796 | Mahler | Dec. 17, 1929 |
| 1,781,265 | Baylis | Nov. 11, 1930 |
| 1,827,165 | Pfaff et al. | Oct. 13, 1931 |
| 2,192,000 | Wilson | Feb. 27, 1940 |
| 2,459,903 | Voorhees | Jan. 25, 1949 |
| 2,485,626 | Mills | Oct. 25, 1949 |
| 2,588,402 | Milliken | Mar. 11, 1952 |

FOREIGN PATENTS

| 239,169 | Great Britain | July 6, 1926 |

UNITED STATES PATENT OFFICE
CERTIFICATE OF CORRECTION

Patent No. 2,898,304                      August 4, 1959

Manly J. Powell et al.

It is hereby certified that error appears in the printed specification of the above numbered patent requiring correction and that the said Letters Patent should read as corrected below.

Column 2, line 41, for "dispensing" read -- dispersing --; column 3, line 17, for "obained" read -- obtained --; column 5, lines 17 and 18, for "illustraing" read -- illustrating --; column 6, line 40, for "microshperes" read -- microspheres --.

Signed and sealed this 2nd day of August 1960.

(SEAL)
Attest:
KARL H. AXLINE
Attesting Officer

ROBERT C. WATSON
Commissioner of Patents